United States Patent Office 3,745,142
Patented July 10, 1973

3,745,142
PROCESS FOR PREPARING HIGHLY
FILLED POLYOLEFINS
Bert H. Mahlman, West Chester, Pa., assignor to
Hercules Incorporated, Wilmington, Del.
No Drawing. Continuation-in-part of application Ser. No. 777,198, Nov. 19, 1868, which is a continuation-in-part of application Ser. No. 694,885, Jan. 2, 1968, now abandoned. This appplication July 29, 1971, Ser. No. 167,511
Int. Cl. C08f 45/04, 45/08
U.S. Cl. 260—41 R                              12 Claims

ABSTRACT OF THE DISCLOSURE

A process for preparing olefin polymer compositions containing very high loadings of inorganic filler material which comprises having the olefin polymer initially present in the form of tiny submicron size particles. A uniform distribution of polymer and filler is easily achieved with this technique.

---

This application is a continuation-in-part of my copending application U.S. Ser. No. 777,198 filed Nov. 19, 1968, which in turn was a continuation-in-part of U.S. Ser. No. 694,885, filed Jan. 2, 1968, both now abandoned.

This invention relates to compositions comprising an olefin polymer and a major proportion of an inorganic filling material. More specifically, it relates to such compositions wherein a high molecular weight olefin polymer is employed as a binder for the inorganic filler and to a process for preparing such compositions.

It is known to prepare highly filled compositions comprising as much as 80 to 95% of an inorganic filler material in an olefin polymer or copolymer matrix. However, preparation of such compositions has heretofore been limited to relatively low viscosity (i.e., low molecular weight) polymers or to processes wherein the matrix polymer was formed in the presence of and in contact with the filler materials.

Except with very low molecular weight polymers, i.e., I.V. 1.5 and less, it has ordinarily not been found practical to prepare compositions having greater than about 30% filler by weight using preformed polymer. With such low molecular weight matrix polymers, low strength structures of limited utility result, when highly loaded. With high molecular weight polymers, the melt viscosity makes uniform incorporation of the filler impossible.

It is the object of the present invention to provide a method of preparing shaped articles comprising α-olefin polymers and copolymers, containing a major proportion of a particulate, inert, inorganic filler. More particularly, this invention provides a process for preparing shaped articles of a crystallizable olefin polymer containing about 33 to 95% of an inert, inorganic filler which comprises (1) preparing a crystallizable olefin polymer in the form of fine particles having an average primary particle size of 0.02 to 0.5 micron, with at least about 75% of said particles being between about 0.2 and 0.4 micron with substantially no irreducible clusters of particles greater than 5 microns, (2) adding to said olefin polymer about 50 to 1900%, based on the weight of olefin polymer of a solid, particulate, inorganic filler material which is insoluble in the olefin polymer, which is solid at the melting point of the olefin polymer and which is in the form of particles of about 0.1 to 25 microns, (3) shaping the resultant polymer-filler blend; and (4) fusing the olefin polymer to form a continuous phase.

The olefin polymers which can be employed in the practice of this invention are propylene homopolymer and crystallizable copolymers of ethylene, propylene, butene-1, 3-methyl butene-1, 3-methyl pentene-1, 4-methyl pentene-1, or styrene with up to 25% of a second α-olefin having 2 to 20 carbon atoms, including, inter alia, ethylene, propylene, butene-1, pentene-1, 3-methyl butene-1, hexene-1, 4-methyl pentene-1, 3-methyl pentene-1, heptene-1, octene-1, decene-1, dodecene-1, tetradecene-1, hexadecene-1, octadecene-1, eicosene-1, styrene, and alkyl- and halo- styrenes such as p-methyl styrene and p-chlorostyrene. Preferred olefin polymers are propylene homopolymer, random copolymers of propylene with up to about 10 mole percent ethylene, block copolymers of propylene with up to about 25 mole percent ethylene and random copolymers of ethylene with about 5 to 13 mole percent propylene.

The term "crystallizable polymer" is employed in this specification to denote a polymer of which at least about 80% is in the crystalline form or is structurally capable of assuming the crystalline form. This is in contrast to a totally amorphous material which cannot assume the crystalline form. It is not intended to include totally amorphous polymers and copolymers within the scope of the instant invention.

Two other properties of the polymer are critical, namely the molecular weight, or intrinsic viscosity, and the particle size. The highly filled compositions included within this invention must have a matrix polymer of high molecular weight or intrinsic viscosity (I.V.) in order to have sufficient strength to form an integral structure. The precise minimum I.V. will depend upon the degree of loading and also upon the polymer being used. In general, an I.V. of at least about 2 is required for loadings of up to about 80% and about 5 for the upper levels. There is no upper limit on the I.V. so far as the process of the invention is concerned. The upper I.V. is limited only by the capabilities of the polymerization process.

The second important factor to be considered is the polymer particle size limitation. In a sense, the limitation of particle size of the polymer is closely related to its molecular weight or intrinsic viscosity. In the ordinary usage of high molecular weight polyolefins, problems are encountered due to the extremely high melt viscosity of the polymer which hinders flow of the melt. In order to form a uniformly filled composition using prior art methods, with the large particles available to the prior art, it was necessary to add the filler material to molten polymer and agitate, as with a compounding extruder, in order to disperse the filler throughout the mass of the polymer. The viscosity of the melt, as stated, made this a difficult task and the addition of filler compounded the difficulty by increasing the viscosity even more. The increased viscosity due to the presence of the filler also severely limits the amount of filler which can be incorporated in this way. By the process of this invention, the incorporation of the filler is greatly simplified. The filler is blended with the polymer while the polymer is suspended in a relatively mobile, non-viscous inert liquid. This blending can be very uniform due to the extremely small size of the particles of both the polymer and the filler. Thus, when the polymer is melted to fuse the same into a continuous phase, agitation to distribute the filler therethrough is not required. Since agitation is not required, the filler can be of substantially higher concentration than is possible using prior art methods.

Another facet of the polymer particle size limitation of this invention is that it permits a wider latitude of sizes of molded objects, particularly on the thinner end. With large polymer particles, it is difficult to form uniform thin structures, i.e., on the order of 1 mil and less, due again to the problem encountered in causing the thick, high molecular weight polymer to slow sufficiently to form the thin layers.

The highly filled compositions according to this invention have many applications. The filled compositions exhibit reduced cost, dimensional change with temperature, and cold flow, and increased rigidity, modulus, and hardness as compared with unfilled polymers. They are useful, e.g., as coatings, in free films, and as moldable powders. The utility of such filled compositions varies, depending upon the identity of the filler material, which can be any inert inorganic particulate material of the necessary particle size which is insoluble in olefin polymers and which is solid at the melting point of the olefin polymer into which it is to be incorporated. For example, a polymer filled with at least 70% molybdenum sulfide makes an excellent dry lubricant. A composition filled with, e.g., barium titanate, titanium dioxide or similar dielectric material has excellent dielectric properties and can be utilized in the manufacture of highly efficient capacitors of small physical size. Calcium carbonate or similar hard, inert material yields a rigid, durable and inexpensive material suited for use as floor tile or the like. Metallic iron or ferric oxide particles yield a magnetic product. A film of the polymer can be filled with a refractory material to serve as a burn-out binder in ceramics applications. A film of the polymer filled with silica or clay can be used as a paper substitute. Loading the polymer with copper dust, zinc dust, carbon black or similar conductive material imparts electrical conductivity. Films of such loaded polymers are useful as electrodes in preparation of electrical cells or batteries. It has also been found that these highly filled compositions can be cold drawn to form oriented porous films which are useful as filters, permeable membranes, and laminating members. If the filling material is soluble, as e.g. sodium chloride, it can be extracted to leave a porous film without necessity for a drawing step or to increase the porosity of a drawn film. Such porous films can be used as separators in the battery application mentioned above, as well as for supports for a depolarizer such as manganese dioxide in such applications. Many other possible uses will be readily apparent.

The small particles of polymer which are useful in the compositions according to the instant invention can be prepared by any technique which will result in sufficiently small particles, which can be dispersed in inert media. However, since the art has not previously been acquainted with such particles, the following very effective method of preparing the same is presented.

The colloidal size particles used in this invention can be prepared by polymerizing the desired α-olefins in the presence of a colloidal dispersion of a trivalent titanium containing catalyst. It is well known that α-olefins such as propylene can be polymerized with the aid of catalysts containing organometallic compounds in combination with transition metal compounds. Particularly effective catalysts for this purpose are combinations of alkylaluminum compounds and titanium compounds. When preparing the colloidal dispersions of crystallizable olefin polymers, it is necessary first to prepare a colloidal trivalent titanium containing catalyst and then use this catalyst in combination with an aluminum alkyl compound to polymerize the α-olefin and obtain the colloidal dispersion. Any titanium trichloride can be used for the preparation of the colloidal catalyst provided that it cantains, if any, only a minor amount of the beta form of the titanium trichloride. A particularly active titanium trichloride-containing catalyst is obtained by reducing titanium tetrachloride at low temperature with an aluminum alkyl such as an alkylaluminum sesquichloride and then heat treating the precipitate so obtained. A colloidal dispersion of the trivalent titanium catalyst is then prepared by suspending it in any convenient inert hydrocarbon diluent, as for example, n-heptane, kerosene, etc. To this suspension is then added a dialkylaluminum halide such as diethylaluminum chloride or diisobutylaluminum chloride, in a molar ratio of from about 0.1 to about 4.0 aluminum per titanium. Other catalyst components can be used in conjunction with the titanium and aluminum components such as Lewis bases, as for example, anisole. There is then added from 3 to 40 moles per mole of titanium of a straight chain α-olefin containing at least 6 carbon atoms. Exemplary of the α-olefins that may be used for this purpose are: n-hexene-1, n-octene-1, decene-1, undecene-1, dodecene-1, and hexadecene-1. The polymerization of this long chain α-olefin is generally carried out at moderate temperature, as for example, from about 30° C. to about 70° C. There is obtained by this process a colloidal suspension of the trivalent titanium-containing catalyst. This colloidal suspension can be used at once or stored until desired.

The propylene polymerization process is carried out by adding to a suitable liquid organic diluent, as for example, a saturated aliphatic, cycloaliphatic, or aromatic hydrocarbon, an aluminum alkyl activator such as diethylaluminum chloride or ethylaluminum chloride alkoxide, in an amount of from about 5 to 10 millimoles per liter of diluent. Exemplary of the diluents that can be used are: hexane, heptane, octane, decane, cyclohexane, benzene, toluene, xylene, and mixtures of such hydrocarbons, as for example, high and low boiling kerosene and other such petroleum fractions, chlorinated aromatic hydrocarbons, highly hindered aliphatic ethers, sulfides, etc., such as di-t-butyl ether, or aromatic ethers such as diphenyl ether. The colloidal dispersion of trivalent titanium catalyst is then added and propylene is introduced at a very slow rate so as to increase the pressure gradually to 75 p.s.i.g. or higher, which pressure is maintained until the polymerization is complete. Hydrogen can be added if desired to produce a lower molecular weight polymer. The propylene polymerization is generally carried out at a temperature of from about 30° C. to about 80° C.

The copolymerization can be effected by contacting the desired mixture of monomers with the colloidal titanium trichloride catalyst in the presence of an aluminum alkyl activator. In the case of the highly reactive gaseous monomers such as ethylene and butene-1, the copolymerization is best carried out using a suitable inert diluent in the same manner as the propylene homopolymerization is carried out. The catalyst dispersion is added to the reaction vessel containing the diluent and about 5 to 10 millimoles per liter of activator. The olefin gas mixture is then introduced at a rate such that the reaction vessel is slowly pressured to the desired amount and the feed is continued to maintain this pressure until the termination of the copolymerization just as in the case of propylene homopolymerizaion. The copolymerization is generally carried out at a temperature within the range from about 10 to 80° C.

When the major monomer is one of the less reactive, liquid olefins such as 3-methyl butene-1, the monomer itself can serve as the reaction medium and the second olefin can be added thereto either periodically or continuously as required to form the desired type of copolymer.

The length of time the polymerization is carried out will be dependent upon the dispersed solids content desired or until the viscosity of the reaction mixture becomes too great for easy agitation. The polymerization is stopped by adding a small amount as for example, 2 volume percent of an alcohol such as n-butanol. The catalyst residues are removed by any of the usual means utilized in the purification of polyolefins, such as for example, an acid, water, or basic wash, treatment with an ion exchange resin or any other convenient means.

The unique combination of properties of the α-olefin polymer and copolymer particles of this invention permits them to be suspended or dispersed in liquid media to form very stable dispersions. Such dispersions can be prepared conveniently by employing the desired diluent as the medium for the polymerization. However, it is also practical to prepare the polymer in a relatively volatile diluent and then displace that diluent with the one desired for a particular application or, in the case where the copolymer is prepared using the major monomer as reaction medium, to displace residual monomer with a more inert diluent for storage or utilization. This diluent transfer is easily accomplished by adding the new diluent to the suspension and thereafter boiling off the original diluent under conditions whereby the new diluent does not also vaporize. Alternatively, the dispersion can be centrifuged to separate the particles, the original diluent decanted, the new diluent added and the particles redispersed by shaking. This diluent transfer can readily be effected without changing the size of the copolymer particles. Surprisingly, the diluent transfer can even be accomplished from organic medium to water, although a suspending agent is usually used in this case.

The highly filled compositions can be prepared simply by adding the particulate inorganic filler directly into the dispersion, either organic or aqueous, prepared as above and agitating to make the total dispersion uniform. In many instances, the formation of smooth, stable dispersions of the filler can be aided by the addition of a pigment dispersing aid to the compositions. These are generally low molecular weight, polar group containing polymers which are soluble in the dispersion diluent. Examples of materials which are useful for this purpose include, inter alia, low molecular weight long oil alkyds, vinyl pyrrolidone polymers, and maleic anhydride modified amorphous polypropylene. The polymer-filler blend can be shaped directly from the dispersed form or the dispersing medium can be removed and the composition employed in the form of a dry blend. When the composition is shaped while in the dispersed form, the dispersing diluent is vaporized by the heat used to effect the fusion of the polymer into a continuous phase.

When shaping the composition in the dispersed form, it is sometimes desirable to add additional diluent prior to shaping in order to maintain an easily workable viscosity. The need for such additional diluent will be determined by, e.g., the concentration of polymer and filler, density of the filler and particle size of filler. Care must be taken, however, to assure that the dispersions are not reduced to a concentration such that thick structures cannot be prepared if desired.

The filled compositions, in dispersion form, are readily shaped by extrusion, casting, and similar operations such as are commonly employed in forming liquid compositions. In some cases, it is helpful to add small amounts of wax, oil, or other types of flux to improve flow properties of the dispersion.

The diluent can readily be removed from the dispersions to form dry blends by simple evaporation techniques, employing vacuum if the diluent is high boiling. The drying results in formation of friable, readily pulverized cakes. Alternatively, prior to addition of the filler material, the polymer can be isolated from the diluent, as e.g. by centrifuging, and the dried particles can be mixed with the filler by techniques conventionally employed to blend dry solids. Either way, the dry blends are preferably shaped by molding.

The olefin polymer employed in the compositions according to this invention will normally be stabilized against degradation by light and heat as is customary in the polyolefin art. Any of the large variety of polyolefin stabilizers and antioxidants known to the art can be employed for this reason. Since these are well known and form no part of this invention, they will not be catalogued herein. Suffice to say that, generally, phenolic compounds and compounds containing organic sulphur are preferred. In some cases, other stabilizers useful for specific purposes can be included, as, e.g., a copper antagonist such as melamine is necessary if the inorganic filler is a material containing or likely to produce metallic copper.

The stabilizers and antioxidants can conveniently be added to the colloidal dispersions of the polyolefin, prior to the incorporation of the particulate filler material therein. These stabilizers are usually soluble in the dispersing medium and thus will be distributed relatively uniformly throughout the mass after removal of the diluent.

In the following illustrative examples, the invention is exemplified in several of its many embodiments. Parts and percentages are by weight in all cases unless otherwise noted.

EXAMPLE 1

This example is intended to exemplify the preparation of polypropylene in the form of small particles of the size required for practice of the invention.

A nitrogen filled reaction vessel, equipped with an agitator and cooled to 0° C. by ice water, wah charged with one mole of titanium tetrachloride added as a 25% solution in a purified petroleum fraction (boiling range 165–200° C.). Over a period of 4 hours, there was then added 1.3 moles of ethylaluminum sesquichloride as a 25% solution in the purified petroleum fraction. The reaction mitxure was agitated an additional 2 hours at 0° C. and then was allowed to warm to room temperature, after which it was heated to 80–85° C. for 3 hours to complete the reduction of tetravalent titanium to trivalent titanium. The titanium trichloride-conaining precipitate was separated and washed with portions of kerosene, after which it was held at 100° C. for 24 hours to complete the activation of the catalyst.

A nitrogen filled reaction vessel was charged with 200 ml. of n-heptane, 12 millimoles of diethylaluminum chloride and 6 millimoles of the above prepared titanium trichloride catalyst. With the temperature adjusted to 50° C., there was then added 88 millimoles of n-octene-1 in a single injection. The mixture was held for 1 hour at 50° C., during which time the titanium trichloride dispersed to a translucent red colloid. The colloidal dispersion was then transferred to a reactor which had been charged with 2 liters of heptane and 20 millimoles of the reaction product of diethylaluminum chloride with a molar equivalent of 2-ethylhexanol, all under an atmosphere of nitrogen at atmospheric pressure and a temperature of 50° C. Propylene was then admitted to the reactor to raise the pressure to 15 p.s.i.g. over a period of 35 minutes, the pressure was vented to remove most of the nitrogen, the slow pressuring to 15 p.s.i.g. of propylene during 25 minutes and the venting was repeated and finally the pressure was taken to 45 p.s.i.g. during a period of 50 minutes and was maintained at that pressure throughout the polymerization. Pressure was maintained at 45–50 p.s.i.g. until 7 hours time had elapsed from the first introduction of propylene. The reaction was then shortstopped by adding 40 ml. of n-butanol and the reaction mixture was stirred overnight at 50° C. It was then transferred to another vessel containing 500 ml. of 3% aqueous hydrogen chloride, after which it was agitated for 3 hours and finally was washed neutral with water. The colloidal polypropylene dispersion so obtained had a solids content of 25.7%, 89.1% of which was crystallizable polypropylene. The polypropylene particles were less than 0.5 micron in size and there were no clusters of the particles larger than 4 microns. The dried total polymer had an intrinsic viscosity of 12.2.

The resultant dispersion was stabilized by the addition thereto of 0.5% of a phenolic antioxidant and 0.25% distearyl-thiodipropionate. The stabilizers were added to the dispersion and agitated until dissolved.

EXAMPLE 2

A stabilized polypropylene dispersion similar to that of Example 1 in kerosene as the diluent was formulated as follows:

| | Parts |
|---|---|
| Polypropylene dispersion (23% solids) (I.V. 9.6, 0.3 micron particles) | 211 |
| Wetting agent (50% in kerosene) | 7.7 |
| Zinc oxide | 192.0 |
| Additional diluent | 31.2 |
| ZnO/binder ratio (by weight) 79:21 | |

Films of this composition were cast with a 20-mil knife on chrome-plated panels, baked 7 minutes at 400° F., and quenched in cold tap water. The coatings were white and could be stripped as free films.

When additional zinc oxide was added to adjust the filler to binder ratio to 88.5/11.5, the film which resulted was still white and accepted ordinary writing ink, but could not readily be handled as a free film.

The above composition having the 79/21 filler:binder ratio was cast on photocopy base paper stock with a #20 Meyer rod, baked 3 minutes at 375° F. and air cooled. A uniform, non-glossy, white coating (7.4 lbs./ream) resulted.

EXAMPLE 3

Following substantially the same procedure as that set forth in Example 1, an 18.7% dispersion of small particle polypropylene having an I.V. of 12 and an average particle size of 0.2 micron was prepared in xylene.

Seventy-five (75) parts of this dispersion was formulated with 150 parts of a CaCO₃ dispersion to form a filled composition having a filler/binder ratio of 77/23. The CaCO₃ dispersion contained 40.1% CaCO₃, 2.0% maleic anhydride modified stereoregular polypropylene (0.7% maleic) and 57.9% kerosene, and was ball milled 40 hours to assure very fine dispersion.

The above dispersion was coagulated by adding 200 cc. of acetone with stirring, then filtered, washed three times with 200 cc. portions of isopropanol and dried in a vacuum oven at 60° C. to constant weight.

This composition was compression molded between polished plates at 232° C. for 5 minutes into test specimens ⅛ and 1/16 inch thick. Tensile properties were as follows:

| | |
|---|---|
| Tensile strength p.s.i | 3800 |
| Modulus p.s.i | 210,000 |
| Elongation percent | 3.3 |

The above composition was molded into floor tiles which were wear tested in a laboratory corridor. These tiles were similar in appearance and of about the same flexibility as a standard commercial vinyl asbestos tile. The results of wear testing on the floor indicated that the compositions possessed excellent durability and stain resistance.

EXAMPLE 4

The following composition was prepared by agitating vigorously in a propeller-type blender:

| | Parts |
|---|---|
| Polypropylene dispersion in kerosene (22.7% solids, I.V. 9.6, 0.3 micron particles) | 211 |
| Wetting agent (5% in dispersion medium) | 7.7 |
| CaCO₃ | 192 |
| Additional diluent | 78 |
| Ratio CaCO₃:polymer, 79:21 | |

The mass was then cast into a layer about 20 mils thick on chrome-plated brass panels, baked 7 minutes at 204° C. and quenched in cold tap water. The resulting 8 mil film was white and translucent and accepted ordinary writing ink readily. The film could be stripped from the panels and handled. It had the following tensile properties:

| | |
|---|---|
| Elongation at break percent | 2.3 |
| Tensile strength p.s.i | 2420 |
| Tensile modulus p.s.i | 280,000 |

Sheets prepared with this formulation are useful as tiles or counter-top laminates, e.g.

EXAMPLE 5

The composition of Example 4 containing a filler/binder ratio of 79/21 was cast into a 10-mil sheet and was biaxially stretched 4× in each direction at 125° C. at 0.3 inch/minutes. The resultant sheet was white and soft and had a leathery texture. Its thickness was about 5 mils and its density about 0.27 gm./cc. When examined microscopically, it showed numerous voids and was highly porous to acetone. Its tensile properties were:

| | |
|---|---|
| Tensile strength p.s.i | 1200 |
| Tensile modulus p.s.i | 8000 |
| Elongation at break percent | 22 |

Such sheets are useful as artificial leathers, filter media, selectively permeable membranes and ion exchange membranes, inter alia.

EXAMPLE 6

The following pigment grind was prepared by grinding for 20 hours in a ball mill:

| | Parts |
|---|---|
| Molybdenum sulphide | 900 |
| Kerosene | 900 |
| Maleic anhydride modified amorphous polypropylene (0.7 wt. percent m.a.) | 45 |

Three hundred parts of this pigment dispersion were added to 144 parts of a dispersion of 25% polypropylene of I.V. 10 and 0.4 micron particle size in kerosene to yield a dispersion containing filler to binder in a ratio of 77:23. A steel panel was primed by spray coating with a dispersion of crystalline polypropylene modified by chemical addition of 0.7 wt. percent maleic anhydride and baking for 5 minutes at 200° C. to fuse the coating. The primed panel was then coated with the polymer—MoS₂ dispersion using a 15-mil knife, air dried for 2 hours, baked 7 minutes at 205° C. and quenched in cold tap water. The coating formed an excellent bearing surface when in contact with another steel member.

Another portion of the composition was dried of diluent by heating in an aluminum pan and was then compression molded into a sheet. This sheet exhibited properties as follows:

| | |
|---|---|
| Tensile strength p.s.i | 2800 |
| Tensile modulus p.s.i | 274,000 |
| Elongation at break percent | 3.3 |

The coefficient of friction was 0.134 as determined by ASTM D-1894, which compares favorably with 0.125 for a Teflon coating.

EXAMPLE 7

The polypropylene dispersion prepared in Example 1 was filled with an aluminum silicate clay in the form of about 0.8 micron particles analyzing about 38.8% Al₂O₃ and 45.4% SiO₂. The filler to binder ratio was 83.5/16.5 by weight. The dispersion was ball milled 24 hours to improve smoothness, and employed as a paper coating. Very smooth, flexible coatings resulted.

EXAMPLE 8

To demonstrate the greater uniformity of the compositions which can be formed by using the small particles of polymer according to this invention, compositions containing 77% by weight of titanium dioxide were prepared using two similar polymers. One was a polymer of I.V. 6 having an average particle size of about 10 microns. The other was of I.V. 7.4 an average particle size of 0.4 micron.

The titanium dioxide was added, along with polypropylene stabilizer, and 5% (based on titanium dioxide) of maleic anhydride modified amorphous polypropylene to a dispersion of the polymer in heptane. After thorough mixing, the dispersion was air dried in pans to remove the heptane, leaving a friable, small particle powder behind. This powder was compression molded at 230° C. for 5 minutes to form 16-mil shets. Tensile properties of these sheets were as follows:

|  | 10μ particles | 0.4μ particles |
|---|---|---|
| Tensile strength, p.s.i. | 1,300 | 1,920 |
| Elongation at break, percent | 1.3 | 3.0 |
| Tensile modulus, p.s.i. | 160,000 | 168,000 |

The substantial increases noted in all three tensile properties are indicative of a more continuous, uniformly distributed polypropylene phase.

EXAMPLE 9

One hundred parts of a dispersion of 19.2% polypropylene (I.V. 10, 0.4 micron) and 3.8% maleic anhydride modified amorphous polypropylene (0.7 wt. percent maleic anhydride) in heptane was mixed with 100 parts of a dispersion of 75.5% ZnO and 1.5% TiO$_2$, also in heptane. After thorough mixing this was air dried to remove heptane and leave a dry powder of 77/23 pigment to binder ratio. This was formed into sheets of about 10 mils by compression molding at 200° C. for five minutes.

These sheets, which were very hard and rigid were biaxially stretched 200% in each direction at 125° C. The stretched, oriented sheets are soft, leathery, low density structures of high permeability which are useful as filters or selectively permeable members. They are also useful as artificial leather.

Comparison of properties of the molded and stretched specimens is set forth in the following table:

|  | As molded | Stretched |
|---|---|---|
| Tensile strength, p.s.i. | 3,500 | 2,600 |
| Elongation at break, percent | 4 | 41 |
| Tensile modulus, p.s.i. | 300,000 | 20,000 |
| Density, g./cc. | >2 | 1.06 |

EXAMPLE 10

Monofilaments were prepared from a filled composition having a 77/23 by weight filler to binder ratio. A kerosene dispersion containing (based on total solids weight) 69.5% ZnO, 7.5% red iron oxide, 4% maleic modified amorphous polypropylene and 19% polypropylene of I.V. 10 and about 0.4 micron average particle size was cast on a chrome-plated panel with a 60-mil knife. This was baked 10 minutes at 150° C. to remove kerosene, then 7 minutes at 205° C. and quenched in cold tap water. The fused film was stripped from the panel and cut into ⅛ inch strips which were then stretched 400% at 120° C. Tensile properties were as follows:

|  | Unstretched | Stretched |
|---|---|---|
| Width, inches | 0.125 | 0.075 |
| Thickness, mils | 7.4 | 3.6 |
| Tensile strength, p.s.i. | 2,900 | 7,000 |
| Elongation at break | 4 | 8 |
| Tensile modulus, p.s.i. | 100,000 | 106,000 |

The presence of the red iron oxide imparted a uniform coloration to the composition.

EXAMPLE 11

The following composition was prepared by agitating vigorously in a propeller-type blender:

| | Parts |
|---|---|
| Polypropylene dispersion in kerosene (22.7%, I.V. 9.6, 0.3μ particles) | 211 |
| Wetting agent (5% in kerosene) | 7.7 |
| Aluminum flakes (<25 microns) | 48 |
| Ratio of Al to polymer, 50/50 | |

This dispersion was cast on a chrome-plated brass panel, baked 7 minutes at about 200° C. and quenched in cold tap water to form a 3.3 mil film. The properties of this film were measured and compared with an unfilled control of the same polymer.

|  | Filled | Unfilled |
|---|---|---|
| Tensile strength, p.s.i. | 4,200 | 4,700 |
| Tensile modulus, p.s.i. | 460,000 | 73,000 |
| Elongation at break, percent | 2.6 | 660 |

The aluminum filled film also had a reduced permeability to gases.

EXAMPLE 12

A highly filled composition was prepared by adding a calcium carbonate dispersion to a dipsersion of a copolymer containing 94.4 mole percent ethylene and 5.6 mole percent propylene. The following was agitated in a propeller-type mixer:

| | Parts |
|---|---|
| Copolymer dispersion (10.9% in heptane—I.V. 8) | 91.5 |
| Calcium carbonate [1] | 100.0 |
| Polymer:binder ratio, 77/23 by weight. | |

[1] 40.1% calcium carbonate, 2.0% maleic anhydride modified amorphous polypropylene, balance kerosene. Ball-milled 40 hours.

The total dispersion was coagulated by adding acetone with stirring, then filtered, washed three times with isopropaol, and dried in a vacuum oven at 60° C. to constant weight. The resulting dried powder was compression molded into ⅛ inch discs between polished plates at 200° C. for five minutes and cooled in the press. These discs were hard, rigid and resistant to marring with the fingernail.

EXAMPLE 13

A highly filled composition based on a copolymer of about 91 mole percent propylene and 9 mole percent ethylene by mixing in a propeller-type mixer:

| | Parts |
|---|---|
| Copolymer dispersion in kerosene (20.3%, I.V. 10, 0.3 micron particles) | 69 |
| Zinc dust | 86 |
| Additional diluent [1] | 80 |
| Filler:ploymer ratio, 86/14 by weight. | |

[1] Containing 4.3 parts maleic anhydride modified amorphous polypropylene.

The above mass was compression molded into ⅛ inch discs between polished chrome-plated brass panels for 7 minutes at 205° C., then cooled in the press. These discs are extremely hard and abrasion resistant and are useful as sacrificial anodes to prevent corrosion of ferrous metals.

EXAMPLE 14

A blend of carbon black and an ethylene-propylene copolymer having 6.6 mole percent of propylene, an I.V. of 25.5 and an average particle size of about 0.2 micron was prepared as follows:

| | Parts |
|---|---|
| Copolymer dispersion in kerosene (6.3% solids) | 119 |
| High abrasion furnace black (25.2% in xylene dispersion) | 29.9 |
| Xylene | 92 |
| Filler:polymer ratio, 50/50 by weight. | |

The copolymer was stabilized by .05 weight percent 2,6-di-t-butyl-p-cresol. Carbon was added to the copolymer dispersion with stirring and acetone was added to coagulate the mass. The liquid phases were then stripped under vacuum to dryness at 60° C. and the agglomerated powder was milled lightly at 250° C. to reduce the agglomerates to powder. The resulting powder was then pressed into 40-mil plaques at 177° C. for 7 minutes.

Tensile tests were run on these plaques and on an unfilled control of the same polymer. The increased strength and stiffness are readily apparent.

|  | Example 14 | Control |
|---|---|---|
| Tensile strength, p.s.i. | 4,600 | 2,800 |
| Tensile modulus, p.s.i. | 84,200 | 26,100 |
| Elongation at break, percent | 130 | 340 |

Such compositions are very useful molding resins.

EXAMPLE 15

Example 14 was repeated using propylene homopolymer having an I.V. of 3 and particles of an average size of 0.3 micron dispersed in kerosene. This material did not agglomerate when the carbon was added.

Parts
Polypropylene dispersion (18% in kerosene) _____ 41.7
Carbon black [1] (21.6% in xylene) _____ 34.8
Additional xylene _____ 7.2
Polymer: filler ratio, 50/50.

[1] Dispersed with surfactant.

This dispersion was cast on a metal plate and fused to form a continuous, black, corrosion-resistant coating.

EXAMPLE 16

A molding powder was prepared by shaking on a paint shaker with glass beads 125 parts of an 18.6 weight percent dispersion of polypropylene (0.4μ particles, I.V. 10) in heptane, 46.6 parts manganese dioxide, 23.3 parts of a 5% solution of maleic anhydride modified amorphous polypropylene (0.7 weight percent maleic anhydride) in heptane, 0.58 part distearylthiodipropionate, and 1.16 parts of a phenolic antioxidant. The resulting dispersed mixture was then dried of diluent by vacuum stripping.

The dried powder was molded into a 40-mil sheet at about 230° C. for seven minutes at pressure of about 30,000 p.s.i to form a 40 mil film. This film was biaxially stretched 3.5× in each direction at 130° C. to form a porous filled sheet (A) having polymer and manganese dioxide particles in about 1 to 2 ratio by weight.

By a similar procedure a second molded sheet of 40 mil thickness (B) was prepared containing the same polypropylene and electrically conductive carbon black in 1 to 2 ratio by weight. This sheet was not stretched.

Also by the same method, a third molded sheet (C) was prepared containing 5% of the same polypropylene and 95% zinc powder by weight. This sheet was not stretched.

Sheet (A) was vacuum impregnated with an aqueous electrolyte solution containing 25% by weight $NH_4Cl$, 10% $ZnCl_2$, and 0.5% of a wetting agent. A section of the impregnated sheet (A) was sandwiched between sheets (B) and (C) to form an electrical cell of 7.2 sq. in. anode area of which sheets (B) and (C) were the cathode and anode respectively and in which the $MnO_2$ served as the depolarizer. A voltage of about 1.0 volt and a current of 18 milliamperes were measured between the anode and the cathode of this cell.

EXAMPLE 17

A dispersion was prepared by mixing 47.2 parts by weight kerosene, 40 parts by weight of particulate barium titanate (∼1–3μ particle size) and about 13.2 parts by weight of 15% solution in refined kerosene of maleic anhydride modified amorphous polypropylene (0.7% m.a.) and shaking well for 20 minutes. This dispersion was mixed with about 109.7 parts of a dispersion of 19.6% by weight of polypropylene (0.4μ, I.V. 10), 0.25% distearylthiodipropionate, and 0.5% phenolic antioxidant (based on polypropylene) in refined kerosene. The mixed dispersions were thoroughly mixed by shaking, then cast on 4 x 6 x 0.025 in. chrome-plated brass sheets at about 0.03 in. thickness. The diluent was removed and the films were fused in an oven at 205° C. for 7 minutes. The film contained 65% by weight barium titanate.

Some of the above sheets were stripped from the panels and tensile properties thereof were determined to be as follows:

|  | Tensile strength, p.s.i. | Elongation at break, percent | Modulus, p.s.i. | Yield Stress, p.s.i. | Yield Strain, p.s.i. |
|---|---|---|---|---|---|
| $BaTiO_3$ loaded film | 3,110 | 85 | 146,000 | 3,110 | 11 |
| Cast polypropylene film | 7,200 | 725 | 70,000 | 2,323 | 15 |

The remainder of these films containing 65% barium titanate, and others similarly prepared containing 74% barium titanate, were tested in simulated capacitors to determine their dielectric properties using a conventional Wheatstone Bridge. The latter films were not tensile tested because of poor structural integrity on removal from the plates. To test dielectric properties, the films were left on the brass plates which served as one electrode. The exposed surface of the film was metallized with a layer of gold which was in turn contacted with a thick brass electrode.

Results are shown in the following table:

| Amount of $BaTiO_3$ | Thickness of film, mil | Dielectric constant [1] | Dissipation factor [1] | Dielectric strength,[2] kv./mil |
|---|---|---|---|---|
| 65 | 4.3 | 7.2 | 0.0032 | 1.6 |
| 74 | 5.15 | 8.8 | 0.0044 | 1.5 |
| 0 (control) | 4.7 | 2.3 | 0.0003 | 3.0 |

[1] Dielectric constant and dissipation factor measured at 75° F. at 1 kilocycle/sec. frequency.
[2] Dielectric strength measured at 60 cycles/sec. with a voltage increase rate of 500 volts/sec.

What I claim and desire to protect by Letters Patent is:

1. A process for preparing shaped articles of crystallizable polypropylene having an intrinsic viscosity of at least about 2 and containing an inert inorganic filler which process comprises:
   (1) providing said polypropylene in the form of dry powder having an average primary particle size of 0.02 to 0.5 micron, with at least 75% of said particles being between about 0.2 and 0.4 micron with substantially no irreducible clusters of particles greater than 5 microns,
   (2) adding to said polypropylene about 50 to 1900% based on the weight of olefin polymer of a solid, particulate, inorganic filling material which is insoluble in the polypropylene, which is solid at the melting point of the polymer and which is in the form of particles of about 0.1 to 25 microns,
   (3) shaping the resultant polymer-filler blend; and
   (4) fusing the polymer to form a continuous phase.

2. The process of claim 1 where the inorganic filler material is selected from the class consisting of molybdenum sulfide, calcium carbonate, titanium dioxide, barium titanate, carbon black, aluminum silicate clay, iron oxide and zinc oxide.

3. The process of claim 2 where the inorganic filler material is zinc oxide.

4. The process of claim 2 where the inorganic filler material is carbon black.

5. The process of claim 2 where the filler is molybdenum sulfide.

6. A process for preparing shaped articles of crystallizable polypropylene having an intrinsic viscosity of at least about 2 and containing an inert inorganic filler which process comprises:
   (1) providing a dispersion in an inert liquid diluent of said polypropylene in the form of fine particles having an average primary particle size of 0.02 to 0.5 micron, with at least 75% of said particles being between about 0.2 and 0.4 micron with substantially no irreducible clusters of particles greater than 5 microns,
   (2) adding to said polypropylene dispersion about 50 to 1900% based on the weight of olefin polymer of a solid, particulate, inorganic filling material which is insoluble in polypropylene, which is solid at the melting point of polypropylene and which is in the form of particles of about 0.1 to 25 microns,
   (3) shaping the resultant polymer-filler blend; and
   (4) heating the shaped blend to effect vaporization of the inert liquid diluent and fusion of the polymer to a continuous phase.

7. The process of claim 6 where the diluent is removed from the polymer-filler dispersion prior to forming.

8. The process of claim 6 where the diluent is an organic liquid.

9. The process of claim 8 where the organic liquid is a hydrocarbon.

10. The process of claim 6 where the inorganic filler material is selected from the class consisting of molybdenum sulfide, calcium carbonate, titanium dioxide, barium titanate, carbon black, aluminum silicate clay, iron oxide and zinc oxide.

11. The process of claim 6 where the inorganic filler material is zinc oxide.

12. The process of claim 6 where the inorganic filler material is carbon black.

References Cited
UNITED STATES PATENTS

| | | | |
|---|---|---|---|
| 3,475,369 | 10/1969 | Blunt | 260—33.6 U |
| 3,296,170 | 1/1967 | Burkhart et al. | 260—29.6 XA |
| 3,356,629 | 12/1967 | Smith et al. | 260—29.6 XA |
| 3,418,265 | 12/1968 | McClain et al. | 260—29.6 XA |
| 3,503,948 | 3/1970 | Walters et al. | 260—29.6 XA |

MORRIS LIEBMAN, Primary Examiner

S. L. FOX, Assistant Examiner

U.S. Cl. X.R.

260—41 A, 41 B